United States Patent [19]

Besner et al.

[11] Patent Number: 5,731,096
[45] Date of Patent: Mar. 24, 1998

[54] PERMANENT DECREASE OF WOOD HARDNESS BY IN SITU POLYMERIZATION OF PRE-POLYMERS

[75] Inventors: Andre Besner, Montreal; Alain Vallee, Longueuil; Jean-Francois Labrecque, Montreal; Roland Gilbert, Boucherville, all of Canada

[73] Assignee: Hydro-Quebec, Montreal, Canada

[21] Appl. No.: 511,431

[22] Filed: Aug. 4, 1995

[51] Int. Cl.[6] .................. B32B 23/08; B32B 21/08; B05D 3/00; B05D 1/18
[52] U.S. Cl. .................. 428/514; 427/393; 427/440; 428/536; 428/537.1; 428/541
[58] Field of Search .................. 427/393, 440; 428/514, 536, 537.1, 541

[56] References Cited

U.S. PATENT DOCUMENTS

| | | | |
|---|---|---|---|
| 3,713,943 | 1/1973 | Huff | 156/255 |
| 4,205,097 | 5/1980 | Arledter et al. | 427/44 |
| 4,304,820 | 12/1981 | Deubzer et al. | 428/452 |
| 4,323,602 | 4/1982 | Parker | 427/298 |
| 4,567,115 | 1/1986 | Trumble | 428/541 |
| 5,098,589 | 3/1992 | Motogami et al. | 252/622 |

FOREIGN PATENT DOCUMENTS

| | | |
|---|---|---|
| 866 158 | 3/1971 | Canada . |
| 907 232 | 8/1972 | Canada . |
| 1 187 255 | 5/1985 | Canada . |
| 2 041 561 | 11/1991 | Canada . |
| 2 278 708 | 2/1976 | France . |
| 2 661 685 | 11/1991 | France . |
| 54-12524 | 1/1979 | Japan . |
| 1-196302 | 8/1989 | Japan . |
| 3-60645 | 3/1991 | Japan . |
| 4-259506 | 9/1992 | Japan . |
| 05-220712 | 8/1993 | Japan . |
| 5-220712 | 8/1993 | Japan . |
| 9002302 | 6/1990 | Sweden . |

*Primary Examiner*—Joseph L. Schoffer
*Assistant Examiner*—Wu C. Cheng
*Attorney, Agent, or Firm*—Oblon, Spivak, McClelland, Maier, & Neustadt, P.C.

[57] ABSTRACT

A wood article is submitted to a vacuum in an autoclave to remove air that it contains. Then, a solution which contains a wood preservative, a water-soluble cross-linkable prepolymer and a polymerization initiator is introduced into the autoclave. Polymerization to form a polymeric network in the wood article is carried out in an atmosphere substantially free of oxygen, while the preservative is chemically fixed to the wood. The result is a wood article with a permanently reduced hardness and an increased moisture content at equilibrium.

13 Claims, No Drawings

PERMANENT DECREASE OF WOOD HARDNESS BY IN SITU POLYMERIZATION OF PRE-POLYMERS

BACKGROUND OF INVENTION (a) Field of the Invention

The invention concerns a method for treating wood to permanently reduce its hardness. More particularly, the present invention relates to a method for providing a permanent decrease of the hardness of wood and an increased moisture content at equilibrium by in situ polymerization of prepolymers therein. The invention is also directed to articles of wood which are impregnated with polymeric networks providing a permanent reduction of their hardness and an increased moisture content at equilibrium.

(b) Description of Prior Art

The assignee of the present invention owns about 2.2 million wooden posts for its power distribution system, nearly all of which are treated with a solution of pentachlorophenol (PCP) in oil. Every year, about 70,000 new posts are added to the network, for new lines or to replace old or damaged posts. Pentachlorophenol is an oil formulation which has the advantage of reducing wood hardness and providing suitable climbability to wood posts.

Formulations based on hydrosoluble preservatives such as chromated copper arsenate (CCA) cause wood to harden, making wooden posts more difficult to climb. A CCA type C solution normally contains 19% CuO, between 16 and 45% $As_2O_5$ and between 36 and 65% $CrO_3$. To these particular formulations, various additives may be added which have the property of decreasing wood hardness to a level wherein its climbability is acceptable. These additives include polyethylene glycol (PEG 1000), marketed under the trade designation CCA-PEG, and polyethylene glycol of higher molecular weight (PEG 8000), marketed under the trade designation CCA-PEG⁺. Another additive is a wax which makes wood impermeable and which has been marketed under the trade designation CCA-ULTRAWOOD®. Finally, an additive based on a formulation containing an oil emulsion in water is sold under the trade designation CCA-ET™.

It has been found that formulations containing PEG 1000 are not permanent since an important fraction of this polyethylene glycol located in the first two centimeters of depth is washed away when posts treated therewith are in use. On the other hand, wax formulations cause the wood to harden since the latter dries by losing its natural humidity, which cannot be restored due to its surface which is made impermeable. Finally, although the treatment with an oil emulsion appears to ensure appropriate climbability characteristics, the oil is not bound to the wood and is therefore free to migrate out of the pole with potential environmental impacts.

Japanese Laid-Open Application 1196302 published Aug. 8, 1989 discloses a method wherein a woody material is impregnated with an aqueous solution of water soluble and radically polymerizable compounds, water soluble and radically polymerizable metal salts of organic acids and possibly water soluble salts of inorganic acids. The radically polymerizable compounds may be glycerin di(meth)acrylate, trimethylolpropane di(meth)acrylate, trimethylolpropane triacrylate, polyethylene glycol mono(meth)acrylate or polyethylene glycol di(meth)acrylate. The water soluble and radically polymerizable metal salts are preferably acrylates of Zn, Ba, Ca, Mg or Al. Wood thus treated has good durability, flame resistance, hardness, dimensional stability, rot resistance and insect resistance. This document however does not disclose a specific hardness or an increased moisture content at equilibrium which is maintained during the entire life of a pole.

Japanese Laid-Open Application 5220712 published Aug. 31, 1993 discloses treating wood material with a formulation comprising polyethylene glycol monoacrylate and/or polyethylene glycol monomethacrylate, a cross-linking agent and a polymerization catalyst. Wood material thus treated has improved durability and dimensional stability at a low impregnation degree. As in the previous Laid-Open Application nothing is mentioned about the production of a wood article having a permanent reduced hardness and increased moisture content at equilibrium.

Japanese Patent 79012524 dated May 23, 1979 describes the manufacture of wood plastic composites using an ethylenically unsaturated monomer and a polymerization initiator, thereby preventing local heating and excess buildup. This patent is mute with respect to the hardness of a wood treated by that process, and is therefore not relevant to the subject matter of the present invention.

U.S. Pat. No. 4,567,115 issued Jan. 28, 1986 describes treating wood with an aqueous solution containing water, hexavalent chromium, copper, arsenic and polyethylene glycol 1000. The polyethylene glycol 1000 introduced into the wood treated by this process is easily washed away so that the reduced hardness obtained is not permanent.

Japanese Laid-Open Application 9160645 published Mar. 26, 1991 discloses the preparation of resin-impregnated wood for exterior walls by immersing wood in a polymerizable resin solution including a pyrolignous acid as a preservative. Contrary to the teaching of the present invention, the material obtained is hard (high strength) and does not undergo a permanent reduced hardness.

U.S. Pat. No. 5,098,589 issued Mar. 24, 1992 describes a polymer made of an alkylene oxide chain which can be used as an ion-conductive polymer electrolyte. There is no teaching whatsoever that the polymer may be used to reduce the hardness of wood.

U.S. Pat. No. 3,713,943 issued Jan. 30, 1973 describes a process for treating wood with a polyethylene adduct of a compound containing multi active-hydrogen functionality. This treatment improves the bondability of the wood by reducing the criticality of drying conditions. This has nothing to do with hardness reduction in wood.

Canadian Patent No. 907,232 issued Aug. 8, 1972 relates to the preservation of wood using a monomeric or polymeric methylacrylate which is used in association with a preservative, in order to prolong the service life of wood products, and has nothing to do with the reduction of wood hardness.

Canadian Patent No. 1,187,255 issued Sep. 21, 1989 corresponds to U.S. Pat. No. 4,567,115.

Canadian Patent No. 866,158 issued Mar. 16, 1971 describes a method of manufacturing hard, synthetic polymer-containing wood wherein wood is impregnated with a mixture of a monomer, an additional polymer and a free radical catalyst. The method gives a hard product contrary to the aim of the present invention, which instead intends to reduce its hardness.

U.S. Pat. No. 4,205,097 issued May 27, 1980 relates to a process for producing an impregnated article by impregnating it with a polymerizable solution followed by heat treatment, so as to give a product which needs no aftertreatment. Again this treatment has nothing to do with reduced hardness of the product obtained.

Swedish Patent 9002302 issued Jun. 29, 1990 relates to a wood treatment with a multi functional allyl ether, a (meth) acrylate terminated polyether and/or urethane prepolymer to provide a wood which is dimensionally stable. This invention is of course totally unrelated to the aim of the present invention which intends at permanently reducing the hardness of wood.

Japanese Laid-Open Application 4259506 published Sep. 16, 1992 discloses the use of a dicarboxylic anhydride with a methacrylate to impregnate wood in order to give it high dimensional stability and weather resistance. The same comments apply as those made with respect to Swedish Patent 9002302.

Other references of interest include French 2,661,685 published Nov. 8, 1991, Canadian Application No. 2,041, 561 published Nov. 2, 1991 and French 2,278,708 published Feb. 13, 1978.

It will be seen that none of the references mentioned above provides for a method or a product wherein hardness is substantially permanently reduced, as well as an increased moisture content at equilibrium.

There is thus a need for an additive which enables to permanently reduce wood hardness while being environmentally safe.

SUMMARY OF INVENTION

In accordance with a broad aspect of the invention there is provided a method for the treatment of wood which include a first step wherein articles of wood are introduced into an autoclave under conditions to substantially remove the air contained therein. During the second step, there is introduced into the autoclave a solution containing wood preservatives, and during the third step the articles of wood which have been impregnated with the solution are submitted to a temperature higher than ambient for fixation of the preservatives. The method is characterized in that the solution containing the wood preservatives also contains at least one water soluble prepolymer having reactive groups which may specifically be localized at the end of the main chain or on lateral chains, or random or block distributed in the main chain, the polymer being cross-linkable in the wood in the presence of the solution containing the wood preservatives. The solution also contains a polymerization initiator. The third step is characterized in that it is carried out in an atmosphere which is substantially free of oxygen to allow for the polymerization of the prepolymers. The method provides reduced hardness of the wood and increased moisture content of the wood at equilibrium while ensuring reduced hardness and increased moisture content to be maintained during aging of the wood outside under leaching conditions, substantially at the same level as immediately following the treatment.

Preferably, the wood preservatives are based on copper, chromium and arsenic compounds, for example, chromated copper arsenate (CCA).

The first step is normally carried out under a vacuum of about 600 mm Hg, preferably under a vacuum of 635 mm Hg.

The second step consists of introducing the solution that contains preferably about 2% w/v of chromated copper arsenate into the autoclave at a pressure of about 1000–1040 kPa, preferably 1040 kPa, so as to facilitate penetration of the preservative into wood. Preferably the solution contains about 4 to 10% w/v of prepolymer and up to about 5 weight percent of polymerization initiator with respect to the prepolymer.

The pressure may be maintained at that level for about 5 hours for red pine, after which the solution is flushed away from the autoclave. The third step is normally carried out at a temperature between about 40° and 100° C. for a period of time, preferably for about 2.5 to 16 hours, that allows for a substantial fixation of all the CCA components in the wood and for polymerization of the prepolymers in the wood.

In the prepolymer, the reactive groups are preferably selected from allyl, vinyl, acrylate and methacrylate group or groups issued from compounds having at least one reactive double bond.

A preferred prepolymer is a copolymer of formula:

B' A B' wherein A is a homopolymer or copolymer of ethylene oxide or derivatives thereof, and B' is an acrylate group of the formula:

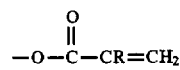

wherein R is H or $CH_3$. The most suitable prepolymer is a polyethylene glycol diacrylate or dimethacrylate.

The invention also relates to wood articles impregnated, preferably at a depth which corresponds to at least a given portion of the sapwood as required for the preservative itself, by the Canadian Stantards Association (CSA) or the American Wood Preservers Association (AWPA) with a polymeric network resulting from a treatment as defined above and characterized by a reduced hardness which is maintained substantially at the same level as immediately following the treatment, when the wood articles are allowed to age outside under leaching conditions. It is believed that these conditions are close to what takes place in nature where the posts are subject to all kinds of weather conditions.

DESCRIPTION OF PREFERRED EMBODIMENTS

Treatment of posts with CCA is normally carried out under specific conditions described in Standard CAN/CSA-080.4-M89 of the Canadian Standard Association (CSA) according to a so-called "full-cells" process.

Generally, the posts are introduced into an autoclave in which a vacuum (e.g. 636 mm Hg) is applied to remove the air contained in wood cells. Then, the treating solution of CCA at 2% is introduced into the autoclave and a maximum pressure of for example 1040 kPa is applied so as to enable the penetration of the preservative into wood. This pressure is maintained for about 5 hours for red pine and the solution is thereafter flushed away. CCA is then fixed to the wood at a temperature of for example 60° C. for a few hours.

In accordance with the present invention, red pine blocks 40 cm long by 8 cm wide were treated under conditions similar to those used in the industry. A CCA solution at a concentration of 50% (w/v), was diluted to a concentration of 2% w/v, according to the norms which are used in the industry. To this solution, there was included a variable quantity (4 to 10% w/v) of prepolymer and a quantity of polymerization initiator equal to 5% of the weight of the prepolymer. A test with PEG 1000 was also carried out at a concentration of 4% w/v, by way of comparison.

The treatment under pressure was carried out in a stainless steel autoclave having a diameter of 25 cm and a length of 80 cm. Fixation of CCA and polymerization, are carried out during the same step called fixation-polymerization. This step is carried out at 95° C. in an atmosphere substantially free of oxygen for a period of 2.5 to 16 hours, depending on the dimensions of the block of red pine. The chosen temperature is dependent on the choice of the polymerization initiator. Five water soluble polymerization initiators having activation temperatures (t½ of 44° C., 56° C., 61° C., 69° C. and 86° C.) respectively #1 to #5, were tested with substantially the same results. These polymerization initiators are respectfully the following:

1) 2,2'azobis[2-(2-imidazolin-2-yl) propane]-dihydro chloride 2) azobis(2-amidinopropane)dihydro chloride 3) 2,2,'-azobis[2-(2-imidazolin-2-yl)propane]

4) 4,4'-azobis(4-cyanovaleric acid)

5) 2,2'-azobis[2-methyl-N-(2-hydroxyethyl)-propionamide].

The preferred initiator was initiator number 5 (t½=86° C.). A plurality of prepolymers have been used, e.g. polyethylene glycol diacrylates (PEGDA) and dimethacrylates (PEGDM), as well as combinations of PEGDA and PEGDM, in which the average molecular weight varied between 200 and 1000. All these prepolymers are soluble in an aqueous medium. The fixation-polymerization step enables to produce a tridimensional network which makes the polymers insoluble. Therefore, it is believed that the polymer fills the cavities of the wood structure. Because the resulting polymers form a network and are insoluble, their molecular weights cannot be characterized. After the step of fixation-polymerization, the blocks of wood are oven-dried to decrease their moisture content to a value around 30%, as it is normally done in the industry. An additional oven-drying is carried out to reduce the moisture content between 15 and 20%, in order to be close to the moisture contents found in similar posts which are in service, for comparison purposes.

The concentrations of PEGDA, PEGDM and PEG 1000 injected into the wood depend on their concentration in the treatment solutions, therefore giving the flexibility to select the concentration of polymer injected into the wood. The initial concentration of PEG 1000 in the solution was 4% w/v. The concentrations of PEG 1000 injected into the wood vary between 11.5 and 15.9 kg/m$^3$. The concentration represents an average over the treated portion of the wood block. The concentrations of PEGDM injected into the wood and measured before polymerization vary between 36 to 58 kg/m$^3$ for an initial concentration in the treatment solution of 10% w/v. When the initial concentration of PEGDM is decreased to 4% w/v, the concentrations injected into the wood vary between 17 and 22 kg/m$^3$. In the case of PEGDA, an initial solution at 10% w/v provides injected concentrations varying between 33 to 48 kg/m$^3$, and from 18 to 24 kg/m$^3$ when the initial concentration is decreased to 4% w/v. At the latter concentrations, PEGDM and PEGDA have average polymerizations of 95 and 60% respectively, as measured under the conditions of operation in the laboratory. The concentration of the polymer after polymerization in the wood was therefore substantially the same as that of the polymer injected in the wood initially, in the case of PEGDM, while it is 40% lower in the case of PEGDA. All the blocks treated under pressure were stuck at room temperature with a test machine consisting of a lineman's spur welded to a hydraulic jack equipped with a load cell, so as to characterize the penetration of the spur at a 35° angle with the wood block. The jack was programmed to provide a force of 8000 N/s, leveling off at 2350N, no matter what the resistance of the wood. These specific angle, force applied and acceleration were selected as typically representing what takes place when someone climbs a post. Three treatments, one with CCA-4% w/v PEGDM, one with CCA-10% w/v PEGDM and the one with PCP were also stuck at -35° C. in order to evaluate the effect of temperature on their performance. The results obtained are given in Table 1. This Table also includes penetration values for red pine posts treated with PCP supplied by a treating company, by way of comparison. The values give the average obtained with 9 samples for tests 1 and 2, and for 3 samples for tests 3 to 18 inclusive. Each sample was stuck 5 times, except for tests 11, 12, 15, 16 which were stuck only once. The standard deviations of the average values are also given. The moisture content of the blocks was measured in the first two centimeters of depth, because it may influence the hardness of the wood. The moisture contents measured and the corresponding standard deviation illustrate that the range of values is sufficiently restricted for these data to be compared with one another. The blocks for each treatment that includes a polymer have been separated into two groups, a group stuck as such and another one washed then stuck. Washing of the blocks in the laboratory enables to emulate an aging as established by comparison with CCA PEG 1000 treated poles that have been in service for a few years, in order to evaluate the permanence of the effect of the polymer additive in wood. It consists in an alternation of washings with demineralized water and periods of drying.

Tests 1 to 4 and 17-18 represent treatments with water, with CCA only, with CCA-PEG 1000 (washed and not washed) and with PCP (room temperature and -35° C.) respectively, carried out by way of comparison. Test 1 (water) gives an average depth of penetration of 17.5 mm, while test 2 (CCA alone) gives a depth of penetration of 15.0 mm. The penetrations obtained with the treatment of PEGDA (tests 5 to 8) are of this order and this treatment seems less interesting, based on the conditions of the test. Test 3 (CCA-PEG) shows the decrease of the hardness obtained with the additive PEG 1000, while test 4 establishes the non-permanence of this additive and of the resulting effect after washing. Tests 17 and 18 (PCP) determine the levels of typical penetration for posts treated with PCP at room temperature and -35° C. These penetration values represent a good reference since the climbability of posts (either jack pine or red pine) treated with PCP, which constitute 95% of the distribution system of the assignee, corresponds to the needs and expectations of the linemen.

It has been noted that a treatment consisting of CCA-4% w/v PEGDM (tests 9 and 10) gives depths of penetration of about 23 mm which corresponds to the penetrations observed for posts treated with PCP (test 17), while a treatment with CCA-10% w/v PEGDM gives depths of penetration of about 29 mm (tests 13 and 14). The results have also established that after washing (test 9 vs 10 and test 13 vs 14), the depths of penetration are the same, which indicates a permanent effect under these conditions.

Stickings have been carried out at -35° C. following treatments with CCA-PEGDM (tests 11, 12, 15 and 16), at concentrations of 4 and 10% w/v, for washed and non-washed blocks. These tests establish that the wood treated CCA-PEGDM hardens slightly at that temperature, as is the case for the wood treated with PCP (tests 18 vs 17), but maintains an adequate depth of penetration.

The time of polymerization varies depending on the size of the pieces of wood, probably due to the thermal inertia of the wood. The polymerization temperature could be lowered but would need a change of the polymerization initiator. Tests made with the other initiators are proven to be satisfactory.

In another experiment, small red pine blocks were treated with CCA in the presence or not of different concentrations of PEGDA and PEGDM prepolymers and processed as described previously. After the final step of fixation and polymerization, these blocks were not oven-dried to decrease their moisture content to a value around 30%, but were rather air-dried at room temperature. These blocks were weighed periodically to calculate their moisture content. The variation of this parameter with time is shown in FIG. 1. This shows that at equilibrium, all blocks incorporating a networked polymer retain more moisture than an equivalent CCA-only treated block.

Although a particular embodiment has been described, this was for the purpose of illustrating, but not limiting, the invention. Various modifications, which will come readily to the mind of one skilled in the art, are within the scope of the invention as defined in the appended claims.

homopolymer or copolymer of ethylene oxide or derivatives thereof, and $B^1$ is an acrylate group of the formula O—C(O)—CR=CH$_2$ wherein R is H or CH$_3$, (ii) adding a polymerization initiator to the solution obtained in (i), and wherein (iii) step (c) is carried out in an atmosphere which is substantially free of oxygen under conditions which allow for the polymerization of said prepolymer, thereby reducing the hardness of said wood by at least 50% as compared to wood treated with chromated copper arsenate (CCA) only when said wood is at a same moisture content, and increasing the moisture content of said wood at equilibrium by at least 60% as compared to wood treated with CCA only, while ensuring reduced hardness and increased moisture content to be maintained during aging of said wood outside, under

TABLE 1

Depths of penetration of a spur at a force of 1778N in wood samples treated with CCA and various polymer additives

| | | Concentration of polymer | | Moisture content | | | |
|---|---|---|---|---|---|---|---|
| Test | Treatment | For treating solution (% w/v) | In the treated portion of the wood block (kg/m$^3$) ± S.D.* | of wood (% MC) (0–2 cm depth) ± S.D. | Washing | Sticking temperature (°C.) | Spur penetration depth at a force of 1778N (mm) ± S.D. |
| 1 | Water | 0 | 0 | 15.1 ± 4.0 | no | 23 | 17.5 ± 2.8 |
| 2 | CCA | 0 | 0 | 14.8 ± 2.6 | no | 23 | 15.0 ± 1.7 |
| 3 | CCA-PEG 1000 | 4 | 14.0 ± 2.1 | 18.0 ± 1.4 | no | 23 | 23.6 ± 4.1 |
| 4 | CCA-PEG 1000 | 4 | 13.4 ± 2.2 | 22.2 ± 3.1 | yes | 23 | 20.2 ± 2.0 |
| 5 | CCA-PEGDA | 4 | 13.4 ± 1.5 | 15.8 ± 2.2 | no | 23 | 15.4 ± 2.0 |
| 6 | CCA-PEGDA | 4 | 9.7 ± 3.2 | 19.5 ± 1.9 | yes | 23 | 16.7 ± 1.9 |
| 7 | CCA-PEGDA | 10 | 23.2 ± 1.4 | 12.3 ± 1.6 | no | 23 | 14.2 ± 1.4 |
| 8 | CCA-PEGDA | 10 | 26.4 ± 7.2 | 21.5 ± 4.7 | yes | 23 | 17.4 ± 1.6 |
| 9 | CCA-PEGDM | 4 | 16.2 ± 3.4 | 16.5 ± 1.3 | no | 23 | 23.6 ± 2.2 |
| 10 | CCA-PEGDM | 4 | 18.5 ± 0.8 | 17.4 ± 1.5 | yes | 23 | 22.8 ± 2.5 |
| 11 | CCA-PEGDM | 4 | 16.2 ± 3.4 | 16.5 ± 1.3 | no | −35 | 19.3 ± 2.0 |
| 12 | CCA-PEGDM | 4 | 18.5 ± 0.8 | 17.4 ± 1.5 | yes | −35 | 18.1 ± 1.2 |
| 13 | CCA-PEGDM | 10 | 47.5 ± 4.6 | 18.2 ± 2.1 | no | 23 | 28.9 ± 2.0 |
| 14 | CCA-PEGDM | 10 | 45.6 ± 11.4 | 20.1 ± 2.5 | yes | 23 | 28.6 ± 1.8 |
| 15 | CCA-PEGDM | 10 | 47.5 ± 4.6 | 18.2 ± 2.1 | no | −35 | 22.9 ± 0.65 |
| 16 | CCA-PEGDM | 10 | 45.6 ± 11.4 | 20.1 ± 2.5 | yes | −35 | 23.8 ± 0.90 |
| 17 | PCP-oil** | — | — | 24.4 ± 2.8 | no | 23 | 23.7 ± 2.4 |
| 18 | PCP-oil** | — | — | 24.4 ± 2.8 | no | −35 | 19.9 ± 2.9 |

*Standard deviation
**Tests made with posts as supplied by a treating company

We claim:

1. In a method for the treatment of wood which includes:
   (a) introducing articles of wood into an autoclave under conditions to substantially remove air contained therein,
   (b) introducing into said autoclave a treatment solution containing a wood preservative comprised of chromated copper arsenate, and
   (c) submitting articles of wood impregnated with said treatment solution to a temperature higher than ambient so as to fix said preservatives,
   the improvement wherein said treatment solution is prepared by
   (i) adding a water soluble prepolymer to a preliminary solution of said wood preservative, said water soluble prepolymer having reactive groups, which may specifically be localized at the end of the main chain, said prepolymer being cross-linkable in said wood when said wood is in the presence of said treatment solution containing said wood preservative and having the formula $B^1AB^1$ wherein A is a leaching conditions, substantially at the same level as immediately following said treatment.

2. Method according to claim 1, wherein the first step is carried out under a vacuum of about 600–650 mm Hg.

3. Method according to claim 1, wherein said solution contains about 2% w/v of chromated copper arsenate.

4. Method according to claim 3, wherein said solution is introduced into said autoclave at a pressure of about 1000–1040 kPa so as to facilitate penetration of the preservative into wood.

5. Method according to claim 4, wherein said pressure is maintained for a period of time that allows for penetration of said chemicals in sapwood, after which the solution is flushed away from the autoclave and temperature is then maintained within a range from 40° C. to 100° C. for a period of time that allows for a substantial fixation of all the CCA components in the wood and a polymerization of the prepolymers in the wood.

6. Method according to claim 1, wherein said solution also contains about 4 to 10% w/v of said prepolymer and up to about 3 weight percent of said polymerization initiator with respect to said prepolymer.

7. Method according to claim 5, wherein said third step is carried out at a temperature between about 40° and 100° C. for about 2.5 to 16 hours.

8. Method according to claim 1, wherein said reactive groups are selected from allyl, vinyl, acrylate and methacrylate groups or groups issued from compounds having at least one reactive double bond.

9. Method according to claim 1, wherein said prepolymer is a polyethylene glycol diacrylate or dimethacrylate.

10. Method according to claim 1, wherein said polymerization initiator is selected from the group consisting of:

1) 2,2'azobis[2-(2-imidazolin-2-yl)propane]-dihydro chloride 2) azobis(2-amidinopropane)dihydro chloride 3) 2,2'-azobis[2-(2-imidazolin-2-yl)propane]

4) 4,4-azobis(4-cyanovaleric acid)

5) 2,2'-azobis[2-methyl-N-(2-hydroxyethyl)-propionamide.

11. Wood articles impregnated with a polymeric network resulting from a treatment according to claim 1 and characterized by a reduced hardness which is maintained substantially at the same level as immediately following said treatment when said wood articles are allowed to age outside under leaching conditions.

12. Wood articles impregnated with a polymeric network resulting from a treatment according to claim 1 and characterized by a higher moisture content at equilibrium as compared to CCA-treated wood articles.

13. Wood articles according to claim 11, wherein said polymeric network is impregnated at a depth which corresponds to at least a portion of the sapwood.

* * * * *